United States Patent [19]
Sanderson et al.

[11] 3,812,266
[45] May 21, 1974

[54] GREEN TEA CONVERSION USING TANNASE AND NATURAL TEA ENZYMES

[75] Inventors: Gary Warner Sanderson, Englewood, N.J.; Philip Coggon, Orangeburg, N.Y.

[73] Assignee: Thomas J. Lipton Inc., Englewood Cliffs, N.J.

[22] Filed: Aug. 7, 1973

[21] Appl. No.: 386,287

Related U.S. Application Data

[63] Continuation-in-part of Ser. No. 222,231, Jan. 31, 1972, abandoned.

[52] U.S. Cl.............. 426/52, 426/193, 426/435, 426/471
[51] Int. Cl. .............................................. A23f 3/00
[58] Field of Search............................. 99/76, 77

[56] References Cited
UNITED STATES PATENTS
3,484,246  12/1969  Moore, Jr. et al. ................ 99/76

FOREIGN PATENTS OR APPLICATIONS
1,249,932  10/1971  Great Britain ..................... 99/76

OTHER PUBLICATIONS

J. Sci. Food Agric., 3/10/59 Group 170, pp. 172–179 Phenolic Subst. of Manufact. Tea V & VI, Roberts et al.

Primary Examiner—Frank W. Lutter
Assistant Examiner—Steven L. Weinstein
Attorney, Agent, or Firm—Brumbaugh, Graves, Donohue & Raymond

[57] ABSTRACT

Green tea, and specifically fresh green tea leaf, is comminuted, placed in aqueous suspension, treated with tannase, and thereafter converted to black tea to provide black tea extracts of improved characteristics.

15 Claims, 1 Drawing Figure

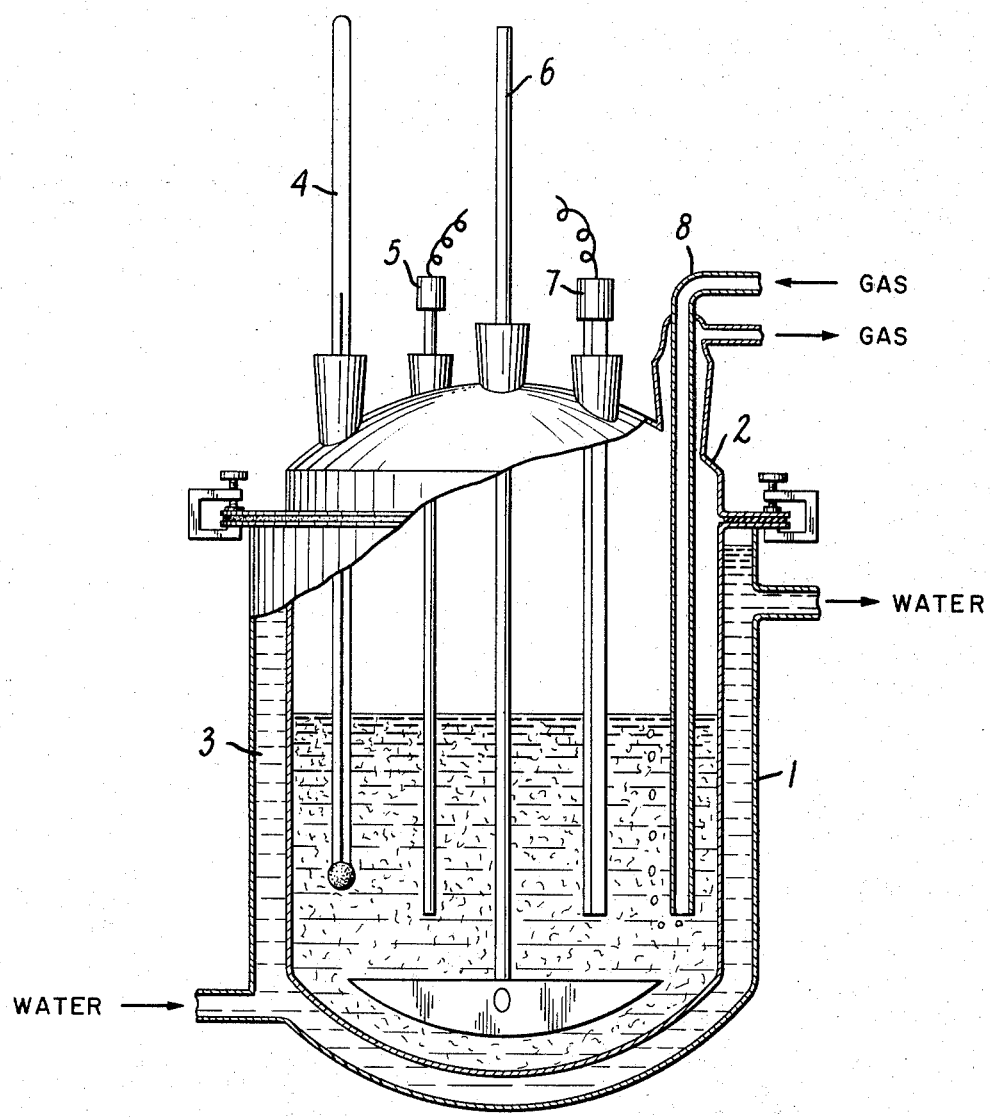

GREEN TEA CONVERSION USING TANNASE AND NATURAL TEA ENZYMES

This is a continuation-in-part of our copending U.S. application Ser. No. 222,231, filed Jan. 31, 1972 now abandoned.

The present invention relates to a process for converting green tea to black tea. More particularly, the invention relates to a combination of steps which require in sequence the treatment of green tea with tannase in the presence of water, followed by conversion of green tea, in the presence of natural green tea enzymes, to black tea extracts.

The term "green tea," as used in accordance with the present invention, includes freshly gathered tea leaves, fresh green tea leaves that are dried immediately after gathering, fresh green tea leaves that have been heat treated before drying to inactivate their enzymes and aqueous extracts of these leaves. It also, in its broader sense, includes fresh green tea leaf material, the latter being defined as any tea leaf material containing the enzymes naturally present in the tissues in an active form. Fresh green tea leaf includes the entire tea shoot tip and leaves from other portions of the tea plant, *Camellia sinensis*, as well as the stem material to which the leaves are attached. Thus, the term "fresh green tea leaf" includes freshly harvested tea leaf, withered tea leaf and fresh frozen tea leaf. In each instance, the green tea described above has undergone substantially no fermentation to the black tea state.

It has now been found that black tea of high quality, good color, giving a good milk reaction, and having a substantially reduced level of cold water insoluble solids is obtained by contacting green tea with tannase and thereafter converting the green tea to black tea in the presence of natural tea leaf enzymes. In one preferred embodiment, fresh green tea leaf is comminuted and contacted with tannase under anaerobic conditions. On the completion of this reaction, the green tea is converted to black tea by sparging with air, after which the leaf solids are separated from the extract and the extract is further processed in accordance with normal black tea extract processing techniques. The resulting product is obtained at a high yield of tea solids and with substantially no tea cream solids, i.e., those solids which are hot water soluble but cold water insoluble. Beverage tea prepared from this product has the excellent flavor of black tea and a highly acceptable bright red color characteristic of high quality freshly brewed tea. Furthermore, the beverage tea provides a "milk reaction" heretofore characteristic only of conventionally brewed tea. Conventionally brewed tea, e.g., tea brewed by steeping black tea leaves in boiling water, will, when milk is added thereto, take on a bright pinkish-red color which is pleasing to the eye. This is in contrast with most instant tea powders, which on reconstitution react badly with milk, taking on a dull, blackish, unpleasant coloration.

In accordance with a preferred embodiment of the invention, fresh green tea leaf is comminuted to ensure that a major portion of the soluble tea leaf constituents are brought into the liquid phase of the tea conversion system. Comminution may be carried out by any convenient means which will not destroy the activity of the tea leaf enzymes, the latter being required for the subsequent step of converting the green tea to black. Suitable comminution techniques include cryogenic milling, i.e., milling the tea leaf while maintaining the tea leaf in a frozen state, and homogenizing the tea leaf in an apparatus, such as a Waring blender.

The comminuted tea leaf is then suspended in water to form a fluid tea leaf homogenate slurry. The preferred ratio of water to fresh tea leaf material is between about 3:1 and 10:1. If the comminution is carried out in a Waring blender, the homogenate is formed directly by blending the water required with the fresh tea leaf.

The tea leaf homogenate may be maintained under anaerobic conditions for the time it is prepared so as to prevent the tea conversion process, which is an aerobic process, from taking place until the pre-conversion tannase treatment is completed. Maintenance of anaerobic conditions may be accomplished by placing the homogenate in a closed vessel and sparging the homogenate with nitrogen gas to remove entrained oxygen. It is not necessary, however, that the anaerobic conditions provide a completely oxygen-free environment. Conditions sufficiently anaerobic for satisfactory tannase pre-conversion treatment are obtained by placing a tea leaf homogenate in a container open to the atmosphere and by providing gentle mechanical agitation, where required, with a minimum of aeration. Thus, while the term "anaerobic conditions" as used in the present specification, describes reaction conditions where no atmospheric oxygen is in contact with the reaction mixture during the reaction, it also describes reaction conditions where atmospheric oxygen is present, but in small amounts.

The tea leaf homogenate is next given a preconversion tannase treatment by contacting the homogenate with a tannase enzyme preparation. The tannase enzyme is preferably added to the homogenate in the amount of about eight enzyme units, as measured by the modified Iibuchi et al. method described infra, per gram dry weight of tea leaf tissue. The treatment is preferably carried out for about 15 minutes to about 2 hours at about 45° C. under anaerobic conditions with gentle continuous stirring.

The anaerobic pre-conversion tannase treatment step may be conducted using a range of enzyme concentrations and for various treatment times. An enzyme level ranging from one to 16 or more tannase units per gram dry weight of green tea leaves, as measured by the Iibuchi et al. method, infra, may be used. A level as low as one unit per gram of tea solids may be used but the yield and quality of product is less than optimum. A level of tannase above the optimum of about eight enzyme units may be used but no substantial additional benefit is obtained.

The temperature at which the pre-conversion tannase treatment is carried out may be varied over a very wide range. Improved yields are obtained over temperatures ranging from 25° to 65° C. At the higher limits of the range, that is, at 65° C., a less desirable conversion of tea solids is obtained and this is probably due to inactivation of the natural tea enzymes at these higher temperatures.

The range of time during which the pre-conversion tannase treatment is conducted under anaerobic conditions has some bearing on the yield of cold water soluble tea solids and the lightness of the color obtained. Unless the tea leaf homogenate is contacted with the tannase under anaerobic conditions for a few minutes, less than optimum yields of a product which is light in color are obtained. Additional treatment, say up to about 15 minutes, provides improved results and an optimum yield and color is obtained after a 15-minute pre-conversion tannase treatment under anaerobic conditions. Additional times up to 120 minutes or more have been used but without additionally improving the yield or color of the product.

Following completion of the pre-conversion tannase treatment, the tea conversion process is effected by adjusting the temperature of the tea leaf homogenate to about 25° C. and sparging the homogenate with air. When the rate of aeration is adjusted so as to maintain about 25 percent oxygen saturation in the homogenate, a satisfactory conversion is effected in about 80 minutes. Hydrogen peroxide may be added to the tea leaf homogenate in controlled amounts to shorten the conversion period. In one preferred embodiment, about 7 ml of 2M hydrogen peroxide solution is added to one liter of homogenate containing about 70 g of tea leaf solids. The hydrogen peroxide is usually added to the homogenate uniformly over a period of about 20 minutes starting about 15 minutes after the aeration is commenced. The end of the tea conversion process is signaled when the degree of oxygen saturation in the tea homogenate rises abruptly. Aeration of the homogenate is contained for about 10 minutes after this rise in oxygen saturation, if hydrogen peroxide is used, at which time the conversion process is terminated by heating the homogenate at about 85° C.

The tea conversion process may also be effected without the aeration step, by controlled addition of hydrogen peroxide to the tannase-treated tea leaf homogenate. This method of conversion utilizes the tea leaf peroxidase enzyme system to convert the green tea constituents to black tea.

The converted tea homogenate is held at about 85° C. for about 5 minutes after which the homogenate is separated into an extract and a tea leaf residue by filtration, centrifugation, or any other convenient means. The leaf residue may be reextracted with water is desired to increase the amount of tea solids recovered in the extract.

The black tea extract thus obtained is preferably dehazed by adding 3 percent, on a tea extract solids basis, of calcium chloride to the extract and thereafter polishing by centrifuging at about 6,900 x g at 10° C. for 10 minutes.

The black tea extract is then concentrated and dried by any appropriate process to form a cold water soluble instant tea powder. The appropriate drying processes include freeze drying and spray drying.

The enzyme tannase which is used in accordance with the present invention is known to hydrolyze the ester linkages as well as the depside linkages of tannic acid between gallic acid and glucose. It also attacks gallic acid methyl ester. One source of the enzyme is as an elaboration product of the growth of certain molds belonging to the genus *Aspergillus* or *Penicillium*. For example, *Aspergillus flavus* grown on a medium containing tannic acid as a sole carbon source provides tannase in substantial amounts. Two specific strains of these microorganisms known to produce substantial quantities of tannase are *Aspergillus oryzae*, ATCC No. 9362 and *Aspergillus niger*, ATCC No. 16888. One suitable preparation is available commercially from the Enzyme Development Corporation. It is obtained with a strain of *Aspergillus oryzae* and is identified by the trade name "Tannase S."

The tannase of the present invention is available commercially as a powder, and it is supplied at varying levels of activity, depending upon its source and the method of recovery used. Tannase S, the commercial preparation described above, has about 20,000 enzyme units per gram of powder, as determined by the modified Iibuchi et al. method described in Example I below.

In accordance with another embodiment, the process of the present invention may be carried out with the enzyme preparations fixed onto solid supports such as glass or polymeric materials to allow removal from the system and reuse of enzymes. Enzyme preparations of this nature are termed "immobilized" or "insolubilized" in the art. Techniques for accomplishing the fixation of enzymes on insoluble matrices are disclosed in U.S. Pat. Nos. 3,519,538, 3,536,587 and 3,556,945. Additional discussions of these techniques may be found in Silmen et al., Annual Review of Biochemistry, 1966, Vol. 35, pp. 873 to 908, and the article "Colloquim on Insolubilized Enzymes," Biochemical Journal, 1968, Vol. 107, pp. 1P to 6P, and H. H. Weetal, "Enzymes Immobilized on Inorganic Carriers by Covalent Attachment," Research/Development, 1971, Vol. 22, pp. 18 to 22. In general, the enzyme insolubilization processes require the fixation of the enzyme to an insoluble matrix by covalent bonding, by adsorption, or by occlusion. The fixed enzyme preparations may be recovered for reuse and provide a means for completely removing the enzyme from the materials undergoing treatment therewith. In addition, the insolubilized enzymes are conveniently provided in particulate form which, in turn, may be packed into columns for use in continuous processes.

The process using immobilized enzymes makes use of an aqueous extract of green tea leaf, either fresh or dried. The extract is given a pre-conversion tannase treatment by contacting the extract solids with immobilized tannase fixed on a suitable support, such as by passing the tea extract through a column packed with the enzyme fixed on glass particles. The tea conversion process is then effected by contacting the tannase treated extract with an immobilized tea enzyme preparation. The tea enzyme preparation is made from fresh green tea leaves by a procedure described by H. Co and G. W. Sanderson (Jour. of Food Sci., 1970, Vol. 35, pp. 160 to 164).

When the process of the present invention is conducted on a small scale, a reaction vessel such as that shown in FIG. 1 of the drawing may be used. Referring to the drawing, the reaction vessel is a glass water-jacketed flange-top vessel 1 fitted with a five-socket flat flanged adapter 2. The vessel's outer water jacket 3 is used to adjust the temperature of the vessel's contents. The flanged-top 2 is fitted with a thermometer 4, a pH electrode 5, a stirrer with an air-tight seal and teflon blade 6, a dissolved oxygen probe 7 and a gas sparge inlet and exhaust gas outlet 8, including a water-filled gas trap.

Various procedures are known to the art for converting green teas to black teas. In addition to the traditional processes which subject freshly picked leaves to withering, rolling, fermentation, firing and drying, there are processes such as those of Moore et al., U.S. Pat. No. 3,484,246 and Seltzer et al., U.S. Pat. No.

2,975,057, which convert green tea slurries or extracts to black tea extracts. It is also known to the art that tea cream obtained from black tea extracts can be solubilized by treatment with the enzyme tannase; this is the subject of copending applications of Sanderson et al., Ser. No. 173,323, filed Aug. 19, 1971; Ser. No. 148,232, filed May 28, 1971 (now abandoned); and Ser. No. 121,514, filed Mar. 5, 1971 (now abandoned).

However, it was found that tannase treatment of black tea solids prepared by fermentation of green tea in solution or slurry would not solubilize tea cream contained in the extracts. Accordingly, it was surprising that the process of the present invention provided a high yield of high quality black tea extract solids with virtually no tea cream.

THEORY OF INVENTION

While the exact mechanism by which the present invention operates is not understood with certainty, it is believed that tannase catalyzes a reaction which, in turn, leads to the formation of cold water soluble tea pigments during the tea conversion process. This is in contrast to the poorly soluble tea pigments which are formed in the conversion process when there is no pre-conversion tannase treatment. It is thought that, in the pre-conversion treatment, tannase catalyzes hydrolysis of the ester linkages between galloyl groups and various compounds known to be present in unconverted tea leaves. The reaction involved is believed to be a deesterification which may be written as follows:

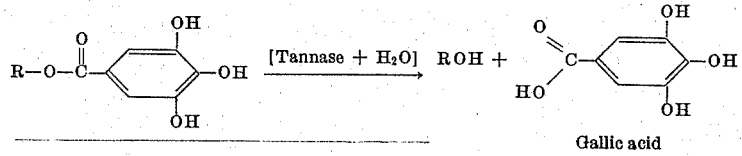

where ROH is any of several different compounds present in green tea leaf, including epicatechin and epigallo-catechin.

It has been established that the effect of this deesterification mediated by tannase is to enhance the natural level of gallic acid and epicatechin in non-converted green tea leaf material. This appears to favor the formation of large amounts of epitheaflavic acid during the tea conversion process. This reaction may be written as follows:

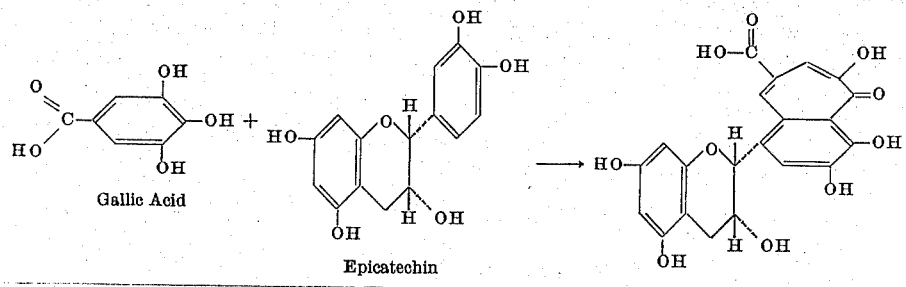

Epitheaflavic acid has been shown to be formed in unusually large amounts during the tea conversion process in tea leaf materials which have undergone a preconversion tannase treatment. Further, epitheaflavic acid has been shown to have a desirable bright reddish black tea-like color, and it has very good cold water solubility properties. Accordingly, one of the major benefits derived from a preconversion tannase treatment is the setting up of conditions which lead to the presence of large amounts of epitheaflavic acid in an instant tea product.

In addition to the above, deesterification of the green tea leaf constituents may prevent the formation of any gallated tea oxidation products by eliminating the precursors of these compounds which are normally present in black tea infusions. The gallated forms of black tea constituents appear to be essential components of the cold water insoluble portion of black tea extracts. Therefore, elimination of the possibility of forming such poorly soluble compounds is probably important in producing instant teas with good color and solubility in good yield when the tea conversion process is carried out after a pre-conversion tannase treatment.

The following examples illustrate the process of the present invention. Percentages of components are expressed on a weight basis unless otherwise indicated.

EXAMPLE I

The method used for the determination of tannase activity of enzyme preparations is a modification of the method described by Sadaaki Iibuchi, Yasuji Minoda, and Koichi Yamada in Agricultural and Biological Chemistry, Vol. 31, p. 513 (1967). This method determines the amount of tannic acid which is hydrolyzed in the presence of a measured amount of the tannase enzyme under a specified set of conditions by measuring the decrease in absorbency of the substrate at a wavelength of 310 nm using a recording ultraviolet spectrophotometer. The solution used for this assay is a 0.004 percent tannic acid solution in 0.02M acetate buffer (pH 5.0). The tannic acid used is Analytical Reagent Grade Tannic Acid, Catalog No. 1764, Mallinckrodt Chemical Works, St. Louis, Missouri. 3.0 ml of this solution is placed in a 1 cm cuvet which is held at 30° C. in the temperature controlled sample chamber of a Cary Model 14 recording ultraviolet spectrophotometer; the device is sold by Cary Instruments, Monrovia, California. Finally, 0.1 ml of enzyme solution is added and the absorbence change at a wavelength of 310 nm is followed continuously. The concentration of the enzyme solution is adjusted until an absorbence change of about 0.01 absorbence units/minute is observed. One unit of tannase enzyme activity measured by this method is defined as that activity which will give a change of one absorbence unit per minute at 310 nm (30° C., 1 cm cell) using a 0.004 percent tannic acid solution in 0.02M acetate buffer (pH 5.0), with a starting absorbence of about 0.7.

Three tannic acid supplies were tested in this assay: namely, (a) Tannic Acid N. F. - Catalog No. 1750 and (b) Tannic Acid Analytical Reagent - Catalog No. 1764 from Mallinckrodt Chemical Works, St. Louis, Missouri; and (c) Tannic Acid N.F. - Catalog No. 1198, Allied Chemical Corporation, Morristown, New Jersey. All three samples of tannic acid give the same results when used in the assay of Tannase S (Enzyme Development Corp., New York, N.Y.) by the method described above, namely, 20,000 units per gram.

Date herein which describe the color and haze of instant tea products are given in terms of results obtained by conducting standard tests using a Hunter D-25 colorimeter made by Hunter Research Associates of Fairfax, Virginia. The haze values are determined by reflectance, and the figures given indicate the amount of reflected light: The lower the haze number, the clearer the tea solution. The tri-stimulus color determination is based on measurements of transmitted light. The L value is the "lightness" factor: A value of 100 indicates no color, whereas a value of 0 indicates absolute darkness. The $a$ value is a measure of the red-blue range of colors, and the $b$ value is a measure of the green-yellow line. When tea solutions are analyzed at beverage strength, i.e., 0.35 percent tea solids, in a 5 cm cell, the preferred L value is in the range of 20 to 35, the preferred $a$ value is at least eight units greater than the L value, and the preferred $b$ value is between about 15 and 25.

EXAMPLE II

Fresh green tea leaf obtained from a tea farm near Charleston, South Carolina was frozen to $-40°$ C. and cryogenically milled to a uniform particle size of about 0.5 to 1.0 mm$^2$ in a hammer mill. This cryogenically milled tea leaf was used throughout the work described below.

Product A: A 171 g sample of the milled fresh tea leaf, having a total solids content of about 25 percent, was slurried with 600 ml of water in the reaction vessel shown in FIG. 1, and nitrogen gas was flushed through the system while the temperature was equilibrated to 25° C. by circulating controlled temperature water through the jacket.

Pre-conversion tannase treatment was carried out by adding 16 mg Tannase S enzyme, as supplied by Enzyme Development Corporation, New York, N.Y., and containing 320 units of activity (as defined in Example I) to the tea leaf homogenate and holding the homogenate under anaerobic conditions with continuous nitrogen sparging for 2 hours at 25° C. By the end of the tannase treatment period, the pH of the green tea leaf homogenate had dropped to pH 4.7, and so it was necessary to adjust the pH of the homogenate back to the initial pH 5.6 with 2N KOH.

The enzymic conversion of the green tea was then carried out in the following way: The fermentation was commenced by changing the sparge gas from nitrogen to air. The rate of aeration was adjusted to maintain the dissolved oxygen level in the homogenate at 25 percent saturation as determined by a dissolved oxygen meter, Model DO 50, New Brunswick Scientific, New Brunswick, New Jersey. The temperature was held at 25° C. throughout the ensuing conversion process. The constant gas flow rate maintained the dissolved oxygen level in the homogenate steady at 25 percent. After 15 minutes of aeration, a 2M hydrogen peroxide solution was added dropwise over a period of 20 minutes so that the total volume of hydrogen peroxide solution added was 16.0 ml. Conversion continued for about another 10 minutes until the dissolved oxygen level began to increase rapidly from 25 percent to about 40 percent saturation in the homogenate. The aeration was continued for an additional 10 minutes, after which the conversion was stopped by changing the sparge gas from air to nitrogen, and the pH was again adjusted with 2N KOH back to pH 5.6 which is the natural pH of most converted tea infusions.

The converted homogenate was heated to 85° C. and held at that temperature for 5 minutes. The tea extract was then separated from the spent tea leaf by filtering the heated homogenate through Miracloth. Calcium chloride (1 percent on a tea solids basis) was added to the filtered tea extract, and the solution was held at 25° C. for 45 minutes. Finally, the extract was cooled to 4° C. and polished by centrifuging at 6,900 x g for 10 minutes. The polished extract was freeze dried in a Stokes P-9 freeze-dryer, manufactured by F. J. Stokes, Philadelphia, Pa., operated at a shelf temperature of 95° C., a plate temperature of $-50°$ C. and a vacuum of 25 torr for 24 hours to produce a cold water soluble instant tea powder. This high yield instant tea product, identified as Product A in Table 1 below, when made into a beverage with cold water at the normal solids concentration of about 0.35 percent, was remarkably tea-like having excellent color and a milk reaction typical of beverage strength infusions of conventionally prepared black tea leaf.

Products $B_1$, $B_2$ and $B_3$: The process used in preparing Product A was repeated using the same quantities of material except that no hydrogen peroxide was added during the fermentation. The dissolved oxygen levels remained constant at 25 percent for about 45 minutes when the expected rapid rise in dissolved oxygen level of the extract was observed. All of the subsequent steps in the preparation of Product A were followed; the freeze dried instant tea powder thus prepared is identified as Product $B_1$ in Table 1 below. The same high yield of tea solids is obtained in preparing Product $B_1$ as was obtained in preparing Product A, but Product $B_1$ was considerably lighter in color.

The procedure described above for the preparation of Product $B_1$ was repeated except that, in the conversion process, the length of the period of aeration after the dissolved oxygen level rose to over 40 percent saturation was increased from 10 to 30 minutes. The freeze dried instant tea powder obtained by this modified procedure is identified as Product $B_2$ in Table 1 below and was characterized as being more tealike than Product $B_1$ with a darker color and good red color.

The procedure was repeated for a further preparation where the extra aeration period was increased from 20 to 60 minutes. The yield of this instant tea powder identified as Product $B_3$ in Table 1, was similar to that obtained for Products $B_1$ and $B_2$, but Product $B_3$ had a much darker, redder tea color than Products $B_1$ and $B_2$.

Product C: The procedures used in the preparation of Product A were repeated using the same quantities of materials with the following exceptions: (a) the pre-conversion tannase treatment was omitted, (b) one quarter of the amount of hydrogen peroxide was added in the conversion process, and (c) a post-conversion tannase enzyme treatment was carried out in the homogenate. The tannase post-conversion treatment was initiated at the end of the conversion period by sparging the homogenate with nitrogen gas (to create anaerobic conditions) and adding 15 mg Tannase S (a total of 300 enzyme units as defined in Example I) to the homogenate. The treatment was carried out at 45° C. under nitrogen for 2 hours after which the pH of the treated extract was adjusted back to the natural value of pH 5.6 with 2N KOH.

The results pertaining to this product, identified as Product C, are summarized in Table 1, and show that post-conversion tannase treatment results in considerably lower process yields than pre-conversion tannase treatment; compare process yields of Product C with those for Products A, $B_1$, $B_2$ or $B_3$ in Table 1. Further, Product C lacked the good tea-like color of Product A as shown by the higher tri-stimulus L value indicating a very light color, and the lower tri-stimulus $a$ value indicating a lack of reddishness.

Products D and E: The process described for Product A was repeated with the following exceptions: (a) the preconversion tannase treatment was omitted for the entire run, (b) the hydrogen peroxide was omitted from the conversion process as for Product $B_1$, and (c) after fermentation and separation of the converted tea extract from the tea leaf residue by filtration, the extract was divided into two equal parts of 240 ml containing 2.8 percent solids each. One portion was further treated as described for Product A except that the calcium chloride dehazing treatment was omitted. The freeze dried instant tea product obtained by this procedure was called Product D. The second portion of the extract obtained above was treated with tannase in the following way: The extract was placed in a temperature controlled water bath held at 50° C., and 15 mg of Tannase S enzyme was added which is equivalent to a total of 300 enzyme units as defined in Example 1, or 40 enzyme units per gram of extracted tea solids. The treatment was continued for 90 minutes after which the pH of the treated extract was adjusted back to the natural pH 5.6 with 2N KOH. The tannase treated and pH adjusted portion of the extract was polished and freeze dried according to the procedure described above for Product A, except that the calcium chloride dehazing treatment was omitted. The freeze dried instant tea product obtained by this procedure was called Product E.

Analytical results pertaining to Products D and E are summarized in Table 1. These results show that there is a significant improvement in yield of cold water soluble instant tea solids, i.e., process yield, when tannase is used in a pre-conversion treatment of green tea leaf homogenates, as can be seen by comparing results for Products A, $B_1$, $B_2$ and $B_3$ with those for Products C, D and E in Table 1. Neither post-conversion tannase treatments of green tea leaf homogenates (Product C), nor post-extraction tannase treatment of extracts (Product E), are effective in increasing the yield of cold water soluble instant tea solids over the no tannase treatment process (Product D).

Besides being obtained from fresh green tea leaf in good yield, Products A and $B_2$ (Table 1) had excellent instant tea qualities in that they had good cold water solubility, good reddish black tea color in solution, good tea flavor, and a good milk reaction. The other products lacked one or more of these qualities.

TABLE 1

Effect of Tannase Treatment on Instant Tea Products Obtained from Homogenate Tea Conversion System

| Product | Extraction yield (%) | Polishing Loss (%) | Process Yield (%) | Tri-Stimulus Color | | |
|---|---|---|---|---|---|---|
| | | | | L | a | b |
| A<br>Tannase Pre-Conversion Treatment: $H_2O_2$ Added | 37.2 | 7.6 | 34.4 | 23.2 | 33.0 | 16.2 |
| $B_1$<br>Tannase Pre-Conversion Treatment: No $H_2O_2$ Added | 36.3 | 6.4 | 34.0 | 42.9 | 44.2 | 29.9 |
| $B_2$<br>Same as $B_1$: 20 Minutes Extra Aeration | 37.0 | 8.2 | 34.0 | 34.9 | 46.7 | 24.1 |
| $B_3$<br>Same as $B_1$: 60 Minutes Extra Aeration | 38.0 | 10.6 | 34.0 | 18.9 | 26.6 | 13.3 |
| C<br>Tannase Post-Conversion Treatment: $H_2O_2$ Added (1/4 Level) | 31.5 | 14.2 | 27.0 | 50.2 | 35.1 | 34.5 |
| D<br>No Tannase Treatment: No $H_2O_2$ Added | 31.9 | 18.7 | 25.9 | 37.1 | 39.6 | 25.7 |
| E<br>Tannase Post-Extraction Treatment: No $H_2O_2$ Added | 31.9 | 14.5 | 27.3 | 35.8 | 37.9 | 24.7 |

EXAMPLE III

The tannase pre-conversion treatment and peroxide addition conditions described for the production of Product A in Example II were repeated using several temperatures for the tannase treatment step. All other reaction and treatment parameters were unchanged. In each case, the tannase treatment was carried out by adding 16 mg Tannase S enzyme preparation containing 320 units of enzyme activity, as measured by the procedure described in Example I, to the tea leaf homogenate containing 171 g of tea leaf. The reaction mixtures were then held at either 25°, 35°, 45°, 55°, or 65° C. for 2 hours while the homogenate was being sparged with nitrogen gas. After the tannase treatment was completed, the reaction mixture temperature was adjusted to 25° C., and further processing of the tea solids was carried out as described for Product A in Example II. Duplicate control runs were carried out at each temperature in which tannase was not added to the tea leaf homogenate although the homogenate was held for 2 hours at the temperature indicated with continuous sparging with nitrogen gas.

The results of these trials are summarized in Table 2. These results show that tannase treatment of tea homogenates improves the yield of cold water soluble instant tea solids at all temperatures of tannase treatment which were studied. Increases in process yields of more than 50 percent were achieved at the higher tannase treatment temperatures. Further, tannase treatment always resulted in products with darker, more tea-like colors indicating that the tannase treatment was effective in setting up conditions which resulted in the production of cold water soluble colored tea constituents in contrast to the poorly soluble colored substances formed when the tannase pre-conversion treatment is omitted. Only at 65° C., the highest temperature used, was a poor conversion of tea solids obtained as shown by the light color of the final product. This effect was probably due to appreciable inactivation of the tea leaf enzymes, polyphenol oxidase and peroxidase, which took place during the tannase pre-conversion treatment at the high temperature.

EXAMPLE IV

A 200 g sample of milled green tea leaf was suspended in 700 ml of water and converted to cold water soluble instant tea solids following the procedures outlined for Product A in Example II. The pre-conversion tannase treatment was effected using 20 mg of Tannase S, which contained 400 units of tannase activity as defined in Example I, for 2 hours at 45° C. under nitrogen. After conversion and extraction, the extract was divided into three portions of 250 ml containing 2.4 percent solids each, and they were given calcium chloride dehazing treatments as follows: The three portions were treated by adding 1 percent, 2 percent and 3 percent (on a tea solids basis) calcium chloride, respectively. The portions were then held at 25° C. for 45 minutes. Finally, the portions were clarified by centrifuging at 6,900 x g for 10 minutes at 4° C., and the polished extracts were freeze dried.

Analytical results (Table 3) show that the clarity of the cold water soluble instant teas produced varies as the level of calcium chloride used is varied. Excellent product clarity was obtained with 3 percent calcium chloride treatment with only a small loss of tea solids as shown by the very slight reduction in process yield obtained with this treatment.

TABLE 3

Effect of Calcium Chloride Dehazing Treatment on Instant Tea Products Obtained from Homogenate Tea Conversion System

| Calcium Chloride Level (%) | Polishing Loss (%) | Process Yield (%) Based on Extraction Yield of 36.2% | Tri-Stimulus Color | | | Haze |
|---|---|---|---|---|---|---|
| | | | L | a | b | |
| 1 | 8.5 | 33.1 | 27.8 | 39.6 | 19.5 | 45 |
| 3 | 9.7 | 32.7 | 30.4 | 41.8 | 21.2 | 25 |
| 5 | 10.1 | 32.5 | 31.6 | 42.0 | 21.9 | 8 |

EXAMPLE V

Five 171 g samples of milled green tea leaf containing 25 percent dry weight were treated in the way described for Product A in Example II except that the amount of tannase enzyme used in the tannase pre-conversion treatment was varied, 4 ml of hydrogen peroxide were added during the conversion, and 3 percent calcium chloride was used in all dehazing treatments. The amount of tannase used in the tannase preconversion treatment was carried out using 32, 16, 8, 2, and 0 mg Tannase S per sample, respectively, which is equivalent to 16, eight, four, one and zero enzyme units (as defined in Example I) per g dry weight green tea

TABLE 2

Effect of Temperature of Tannase Pre-Conversion Treatment on Results Obtained from Homogenate Tea Conversion System

| Pre-Conversion Tannase Treatment | Temperature (°C.) | Extraction Yield (%) | Polishing Losses (%) | Process Yield (%) | Tri-Stimulus Color | | |
|---|---|---|---|---|---|---|---|
| | | | | | L | a | b |
| No | 25 | 32.5 | 18.9 | 26.4 | 34.9 | 36.7 | 24.3 |
| Yes | 25 | 38.4 | 8.3 | 35.2 | 22.6 | 33.2 | 15.8 |
| No | 35 | 32.9 | 16.0 | 27.6 | 30.8 | 36.8 | 21.3 |
| Yes | 35 | 37.3 | 5.4 | 35.3 | 19.4 | 29.8 | 13.8 |
| No | 45 | 31.7 | 16.0 | 26.6 | N.D.* | N.D.* | N.D.* |
| Yes | 45 | 37.0 | 3.8 | 35.6 | 20.7 | 31.9 | 14.9 |
| No | 55 | 31.2 | 16.8 | 26.0 | N.D.* | N.D.* | N.D.* |
| Yes | 55 | 39.9 | 6.1 | 37.5 | 20.3 | 30.9 | 14.3 |
| No | 65 | 28.6 | 16.1 | 24.0 | 39.1 | 30.0 | 26.9 |
| Yes | 65 | 37.9 | 4.5 | 36.2 | 30.3 | 34.2 | 21.0 |

*N.D. = Not Determined leaf, respectively. The results obtained in these three runs are summarized in Table 4, and show that use of eight units of tannase per gram dry weight of fresh green tea leaf gives the highest extraction yields and the lowest level of polishing losses. When the tannase used in the pre-conversion treatment is reduced to one unit per gram tea solids, the overall process yield is low and the appearance is comparable to the product obtained with no tannase treatment. The use of 16 units per gram of tea solids, on the other hand, gives no additional benefit.

TABLE 4

Effect of Tannase Level Used in Pre-Conversion Treatment on Instant Tea Products Obtained from Homogenate Tea Conversion System

| Units of Tannase Per Gram Dry Weight Green Tea Leaf | Extraction Yield (%) | Polishing Loss (%) | Process Yield (%) | Tri-Stimulus Color | | |
|---|---|---|---|---|---|---|
| | | | | L | a | b |
| 0 | 28.9 | 21.6 | 22.7 | 47.6 | 32.9 | 32.8 |
| 1 | 34.8 | 19.5 | 28.0 | 45.2 | 34.1 | 31.1 |
| 4 | 35.0 | 11.5 | 31.0 | 34.1 | 40.3 | 23.6 |
| 8 | 37.0 | 10.6 | 33.1 | 31.2 | 43.9 | 21.7 |
| 16 | 35.8 | 7.3 | 33.2 | 36.7 | 44.9 | 25.4 |

EXAMPLE VI

A 171 g sample of milled green tea leaf, having a total solids content of about 25 percent, was converted to an instant tea product using the procedures adopted for Product A in Example II with the following changes: The pre-conversion tannase treatment was followed exactly except that a temperature of 45° C. was used throughout. The conversion process was modified to use one-quarter of the hydrogen peroxide addition, namely, 4 ml of a 2M solution. The dehazing treatment was modified in that 3 percent (total tea leaf solids basis) calcium chloride was used. The instant tea product made by this method was judged by experienced tea tasters to be remarkably similar in all respects to a black tea leaf infusion.

A second run was made following the above-described processing conditions, except that the pH of the homogenate was not adjusted back to pH 5.6 with 2N KOH after the tannase treatment. The conversion process was therefore initiated at the unusually low pH of 4.7 which resulted from the pre-conversion tannase treatment. Very little color change was noted during the conversion process in this case with the result that the final product was light in color and had none of the red color associated with black tea character. This is reflected in the analytical data (Table 5) for these two products where a normal tri-stimulus $a$ color value is found for the pH adjusted product, but an unusually low value is obtained when the conversion process is carried out in an homogenate with a pH as low as 4.7. The difference was ascribed to the low enzyme activity of the natural tea enzymes caused by the low pH of 4.7, which resulted from the tannase treatment, leading to a poor conversion of green tea solids to black tea. Thus, the second run gave a somewhat better process yield than the first run presumably because it had undergone less conversion. However, the product obtained in Run No. 2 was not considered to be acceptable because of its poor color. In fact, this product resembled an unconverted, tannase-treated green tea extract.

TABLE 5

Effect of pH on the Green Tea Conversion Process

| Run No. | pH Used for Conversion Process | Extraction Yield (%) | Polishing Loss (%) | Process Yield (%) | Tri-Stimulus Color | | |
|---|---|---|---|---|---|---|---|
| | | | | | L | a | b |
| 1 | 5.6 | 37.0 | 10.6 | 33.1 | 31.2 | 43.9 | 21.7 |
| 2 | 4.7 | 38.7 | 7.0 | 36.0 | 34.3 | 19.9 | 22.9 |

EXAMPLE VII

Five 171 g samples of cryogenically milled fresh green tea leaves, 26 percent dry weight, were treated in the way described in Example II for Product A except that the length of the pre-conversion tannase treatment was varied, 4.0 ml of 2M hydrogen peroxide were added during the tea conversion process, and 3 percent calcium chloride was used in the dehazing treatment. The anaerobic tannase treatment was carried out at 25° C. for 0, 15, 30, 60 and 120 minutes, respectively, using eight enzyme units, as defined in Example I, per gram dry weight green tea leaf while maintaining the pH at 5.6 by addition of small amounts of 2N potassium hydroxide. At the end of the pre-conversion tannase treatment period, aeration was commenced, and the conversion was carried out with aeration to maintain 25 percent oxygen saturation in the reaction mixture at 25° C. and pH 5.6. The pH was maintained at 5.6 during the conversion process by addition of small amounts of 2N potassium hydroxide. Extraction, polishing and freeze drying of the instant tea products were carried out as described for Product A in Example II. The 120-minute preconversion tannase treatment was repeated without the tannase addition as a control.

The results obtained for the six products prepared as described above are summarized in Table 6. All of these pre-conversion tannase treatments resulted in the production of good black tea-like products except that the 0-minute tannase treatment resulted in a product which was considerably lighter in color than the others. Omission of the tannase treatment altogether resulted in a poor yield of cold water soluble tea solids which were too light in color to be considered satisfactory as a black tea product.

TABLE 6

Effect of Length of Tannase Pre-Conversion Treatment on Results Obtained from Homogenate Tea Conversion System

| Tannase Treatment Time (min.) | Ext. Yield (%) | Pol. Loss (%) | Process Yield (%) | Tri-Stimulus Color | | |
|---|---|---|---|---|---|---|
| | | | | L | a | b |
| Control (No Tannase) | 28.9 | 21.6 | 22.7 | 47.6 | 32.9 | 32.8 |
| 0 | 33.3 | 9.1 | 30.3 | 37.3 | 42.0 | 25.8 |
| 15 | 34.9 | 11.1 | 31.0 | 32.9 | 41.3 | 22.8 |
| 30 | 35.1 | 12.4 | 30.7 | 32.5 | 41.6 | 22.5 |
| 60 | 37.6 | 14.4 | 32.2 | 33.2 | 42.2 | 23.0 |
| 120 | 36.7 | 13.3 | 31.8 | 32.2 | 41.5 | 22.4 |

EXAMPLE VIII

A tea enzyme preparation is made from freah tea leaves according to the procedure described by H. Co and G. W. Sanderson in the Journal of Food Science, 1971, Vol. 35, pp. 160 to 164. The tea enzyme preparation is used in the tea conversion process described below.

One thousand grams of fresh green tea leaf material is ground up in a Fitzmill. The ground leaf is then extracted with hot water sufficient to provide a 10 to one ratio of water to leaf using the three-cell counter current extraction system described by Seltzer et al. in U.S. Pat. No. 2,927,860. The extract is separated from the insoluble tea leaf residue by centrifugation to provide an extract which weighs about 10 kilograms and contains about 3.7 percent solids.

The extract is given a pre-conversion tannase treatment by adding 0.5 grams of tannase enzyme with a specific activity of 15,000 units/gram as measured by the procedure given in Example I. The extract is then held at 25° C. for 60 minutes with gentle stirring. Upon completion of the pre-conversion tannase treatment, the pH of the extract is adjusted to about pH 5.6. A soluble tea enzyme preparation, which is obtained from about 100 grams of tea leaf in accordance with the Co and Sanderson method described above and which is contained in about 10 milliliters of solution, is then added to the extract to bring about the tea conversion process. The extract is held at about 25° C. throughout the tea conversion process. The extract is now aerated by sparging it with air at a rate sufficient to maintain the dissolved oxygen level at 25 percent saturation until the primary fermentation is completed as indicated by a rapid rise in the level of dissolved oxygen. The conversion is completed by continuing the aeration of the extract at the same rate for about 30 minutes past the end of the primary fermentation period. The converted tea extract is dehazed and polished by adding 3.0 percent (based on total tea extract solids) calcium chloride to the extract, cooling the extract to 10° C., holding the extract at 10° C. for 30 minutes, and then clarifying the extract by centrifuging. The polished extract is then concentrated to 20 percent solids and dried by freeze drying.

The cold water soluble instant tea product obtained by this precedure represents a high yield of solids; and its color, taste, and milk reaction very closely resemble those of freahly brewed black tea.

EXAMPLE IX

Example VIII is repeated with only one major change in the procedure. The enzyme preparations, both natural tea enzymes and the tannase, are immobilized, and used in that form. Immobilization of both Tannase S and the natural tea enzymes from freah green tea leaves is effected by the diazo coupling technique outlined in U.S. Pat. No. 3,519,538 to Messing et al. The precess consists of linking the respective enzyme to glass beads by means of a chemical coupling agent of the type described in the patent as Enzyme-Azo-Silane-Glass bead.

Before use the immobilized enzyme preparation is pre-conditioned by stirring with portions of tea extract. Two successive pre-conditioning operations involving stirring the extract and enzyme for 5 minutes at 50° C. are preferred.

The extract of fresh tea leaves is prepared according to the process outlined in Example VIII. Ten kilograms of the extract containing 3.7 percent solids is treated with the immobilized Tannase S by adding glass beads with the enzyme to the extract at 50° C. The suspension is stirred for 120 minutes with nitrogen sparging throughout to insure anaerobic conditions.

The tannase treated suspension is decanted and the pH is adjusted to about pH 5.6 by addition of potassium hydroxide. Glass beads onto which have been affixed the preparation of fresh tea leaf enzymes are added. The temperature of the suspension is maintained at 25° C. Oxygen is bubbled through the suspension to insure 25 percent saturation until the primary fermentation is completed as indicated by a rapid rise in the level of dissolved oxygen. The conversion is completed by continuing the aeration of the extract at the same rate for about 30 minutes past the end of the primary fermentation period.

The converted extract is decanted and de-creamed following the conditions given in Example II above. The de-creamed extract is then freeze dried following the condition of Example II above. The freeze dried powder when dissolved in cold spring water gives good cold water solubility, a bright reddish tea-like color with a pleasant flavor of a good freshly brewed black tea, and a bright pink color when milk is added.

The process of the present invention is preferably conducted within approximately 1 pH unit of the natural pH of tea infusions. The pre-conversion tannase treatment is preferably conducted at a pH of about 5, and the pH drop resulting from this tannase treatment is preferably nullified by adjusting the treated extracts with potassium hydroxide back to about pH 5.6 before subsequent treatment takes place.

The tea conversion step is preferably conducted within the range of about 4.8 to 6.0, and most preferably at a pH of about 5.6. Above about pH 6.0, non-enzymatic changes occur which may be undesirable. At a pH below about 4.8, an increase in theaflavin may occur but the final products have inadequate tea color and are otherwise of poor quality.

EXAMPLE X

A 171 g sample of milled freshly picked green tea leaf, having a total solids content of about 25 percent, was converted to an instant tea product with black tea character by the procedures adopted for Product A in Example II above, with the following changes:

Run No. 1: Enzymic conversion of the tannase pre-treated green tea leaf homogenate was carried out by making controlled additions of hydrogen peroxide to the homogenate without aeration thereof. This treatment activates the tea leaf peroxidase enzyme, which in turn effects the conversion of green tea constituents to black tea. More specifically, in Run No. 1, the nitrogen sparge was stopped after the preconversion tannase treatment step, and the vessel was opened to the atmosphere to allow pH adjustment to 5.6 with 2N KOH. The vessel remained open to the atmosphere while 1 M hydrogen peroxide solution (32 ml) was then added dropwise over a period of 100 minutes with gentle agitation of the contents. The pH was again adjusted to 5.6 with 2N KOH to complete the conversion process. The extraction of the converted tea leaf homogenate and the remainder of the processing followed the procedures described for Product A in Example II.

Run No. 1 was repeated three times under identical pH and temperature conditions. In Run No. 3, no changes were made except in the addition rate of hydrogen peroxide solution. In Run Nos. 2 and 4, the tannase enzyme was omitted from the pre-conversion treatment which was otherwise the same as for Run Nos. 1 and 3. The rate of hydrogen peroxide addition during the conversion treatment was the same in Run No. 1 as in No. 2.

The effect of the pH of the tea leaf homogenate was studied in Run Nos. 5 through 9. These runs were the same as Run No. 1 above, except that the pH of the tea leaf homogenate was adjusted as shown in Table 7 after the completion of the pre-conversion tannase treatment and prior to the conversion step.

The results of these nine runs are summarized in Table 7. Run Nos. 1 through 4 show that pre-conversion tannase treatment gives rise to good black tea color and improves the overall yield of tea solids by increasing the extraction yield and decreasing the polishing loss. Run Nos. 5 through 9 show that this effect is essentially unchanged over the pH range 3.5 to 7.0. At pH 2.5, a high extraction yield is obtained, but the solution could not be converted from a green color to black tea.

was effected by adding $2.5 \times 10^4$ units of Tannase S. After 1 hour, the slurry was adjusted to about pH 5.6 with 2N KOH. No conversion of the green tea components was noted at this time although the surface of the slurry had been exposed to atmospheric oxygen.

The conversion step was initiated by air sparging the entire slurry. After 20 minutes, 400 ml of a 1M hydrogen peroxide solution was added over a 30-minute period. The air sparge was continued for a total of 2 hours when the aeration was stopped and the slurry was heated to 180° F. After holding the slurry at 180° F. for 10 minutes, the extract and leaf were separated by passage through a Sharples horizontal continuous centrifuge. The spent leaf was extracted a second time with 80 pounds of water, and the two extracts were combined. The combined extracts were adjusted to about pH 5.4 with 2N KOH, and they were concentrated to about 5 percent solids, and 3 percent $CaCl_2 \cdot 2H_2O$ (on a total solids basis) was added. The extract was then cooled to 50° F. and held at that temperature for 30 minutes before polishing by centrifugation. (Westfalia Centrifuge Model No. KDD 605 — rate of 400 ml/min.) The polished extract was concentrated to about 40 percent solids and dried to form a cold water

TABLE 7

Effect of Pre-Conversion Tannase Treatment on Instant Teas Produced by Tea Peroxidase/Hydrogen Peroxide Conversion System

| | Processing Conditions | | | | | Product Characteristics | | | |
|---|---|---|---|---|---|---|---|---|---|
| Run No. | Pre-conversion Tannase Treatment | pH Before Conversion | 1M Hydrogen Peroxide Volume (ml) | Treatment Time (min.) | Extraction Yield (%) | Polishing Loss (%) | Process Yield | Tri-Stimulus Color | | |
| | | | | | | | | L | a | b |
| 1 | Yes | 5.6 | 32 | 100 | 39.7 | 12.1 | 34.9 | 15.7 | 24.5 | 11.1 |
| 2 | No | 5.6 | 35 | 105 | 32.9 | 22.9 | 25.4 | 22.5 | 28.3 | 15.8 |
| 3 | Yes | 5.6 | 25 | 150 | 40.9 | 10.8 | 36.5 | 28.8 | 36.9 | 20.1 |
| 4 | No | 5.6 | 25 | 75 | 34.1 | 15.5 | 28.8 | 31.1 | 31.4 | 21.6 |
| 5 | Yes | 2.5 | 50 | 70 | 43.9 | 2.5 | 42.8 | N.D.* | N.D.* | N.D.* |
| 6 | Yes | 3.5 | 35 | 65 | 37.0 | 4.7 | 35.3 | 32.7 | 39.5 | 22.6 |
| 7 | Yes | 4.5 | 30 | 60 | 36.2 | 18.8 | 29.4 | 28.1 | 41.7 | 19.5 |
| 8 | Yes | 5.6 | 17 | 50 | 35.5 | 11.9 | 31.3 | 20.6 | 32.1 | 14.4 |
| 9 | Yes | 7.0 | 28 | 60 | 37.5 | 10.1 | 33.7 | 20.0 | 29.5 | 14.1 |

*N.D. = Not Determined – Greenish Colored

EXAMPLE XI

Fresh green tea leaf was macerated in a large Hobart food mixer for about 10 minutes, and the macerated leaf was passed once through a large meat grinder using a grinder plate with 1/4-inch holes, and once through a CTC (Cut-Tear-Curl) machine. 30 pounds of ground leaf, having about 22 percent total solids, were placed in an open-topped 30-gallon, jacketed extraction kettle with 130 pounds of water. The slurry was equilibrated to 75° F., and the tannase pre-conversion treatment soluble instant tea powder with excellent black tea character.

The process described above was repeated five times, and the results of the six runs are shown in Table 8. Run No. 7 was a control run in which no addition of tannase was made during the pre-conversion treatment although the 1 hour hold period at 75° F. was included. The results of these runs (Table 8) show that tannase pre-conversion treatment gives high yields of instant tea solids and provides for optimum development of black tea color in the finished product.

TABLE 8

Pilot Scale Preparation of Instant Tea by Homogenate Conversion System with Pre-Conversion Tannase Treatment

| | Processing Conditions | | | | Product Color | | |
|---|---|---|---|---|---|---|---|
| Run No. | Leaf Solids (%) | Extract Yield (%) | Polishing Loss (%) | Overall Yield (%) | Tri-Stimulus Color | | |
| | | | | | L | a | b |
| 1 | 21.7 | 44.5 | 13.3 | 38.6 | 20.5 | 35.6 | 14.5 |
| 2 | 22.1 | 46.0 | 11.1 | 40.9 | 27.3 | 43.2 | 19.1 |
| 3 | 22.1 | 49.2 | 12.9 | 42.9 | 26.2 | 37.3 | 18.3 |
| 4 | 22.6 | 45.7 | 10.4 | 40.9 | 26.1 | 40.8 | 18.2 |
| 5 | 21.8 | 45.6 | 4.4 | 43.6 | 26.8 | 43.2 | 18.7 |
| 6 | 22.5 | 44.9 | 14.0 | 38.6 | 29.5 | 44.0 | 20.6 |
| 7* | 28.9 | 34.9 | 25.6 | 26.0 | 41.9 | 25.0 | 28.5 |

*Control Run No. 7: No tannase used in pre-conversion treatment.

We claim:

1. A process for preparing black tea from green tea comprising the steps of contacting green tea with tannase in the presence of water and within a temperature range in which the tannase is active and thereafter converting the green tea to black tea in the presence of natural tea leaf enzymes, said contacting being for a time sufficient to substantially reduce the amount of tea cream produced in the conversion of green tea to black tea.

2. A process of preparing black tea from green tea comprising the steps of
   a. preparing an aqueous homogenate of green tea leaf,
   b. contacting the homogenate with tannase within a temperature range in which the tannase is active,
   c. converting the green tea to black tea under aerobic conditions in the presence of natural tea leaf enzymes,
   d. separating the leaf residue from the aqueous extract, and
   e. dehazing and polishing the extract, said contacting being for a time sufficient to substantially reduce the amount of tea cream produced in the conversion of green tea to black tea.

3. A process for preparing black tea from green tea comprising the steps of
   a. preparing a hot water extract from green tea,
   b. adding tannase to the extract within a temperature range in which the tannase is active and at a level of at least one enzyme unit per gram of tea solids,
   c. converting the green tea extract to black tea under aerobic conditions in the presence of natural tea leaf enzymes, and
   d. dehazing and polishing the extract, said addition being for a time sufficient to substantially reduce the amount of tea cream produced in the conversion of green tea extract to black tea.

4. A process for preparing black tea from green tea comprising the steps of
   a. preparing a hot water extract of green tea,
   b. contacting the hot water extract with tannase within a temperature range in which it is active, the tannase being immobilized on a support,
   c. converting the tannase treated extract to black tea under aerobic conditions by bringing the extract into contact with natural tea leaf enzymes immobilized on a support, and
   d. dehazing and polishing the extract, said contacting being for a time sufficient to substantially reduce the amount of tea cream produced in the conversion to black tea.

5. A process for preparing black tea from green tea comprising the steps of
   a. preparing an aqueous homogenate of green tea leaf, the ratio of water to tea leaf solids being within the range of about 3:1 to about 10:1 by weight,
   b. adding tannase to the homogenate within a temperature range in which the tannase is active and at a level of at least one enzyme unit per gram of tea leaf solids,
   c. converting the green tea solids to black tea in the presence of natural tea leaf enzymes by controlled addition of increments of hydrogen peroxide thereto, and
   d. separating the leaf residue from the aqueous extract, said addition being for a time sufficient to substantially reduce the amount of tea cream produced in the conversion to black tea.

6. A process for preparing black tea from green tea comprising the steps of
   a. preparing an aqueous homogenate of green tea leaf, the ratio of water to tea leaf solids being within the range of about 3:1 to about 10:1 by weight,
   b. adding tannase to the homogenate within a temperature range in which the tannase is active and at a level of at least one enzyme unit per gram of tea leaf solids,
   c. converting the green tea solids to black tea by aerating the tea leaf homogenate while adding increments of hydrogen peroxide in the presence of natural tea leaf enzymes, and
   d. separating the leaf residue from the aqueous extract, said addition being for a time sufficient to substantially reduce the amount of tea cream produced in the conversion to black tea.

7. A process of converting green tea to black tea comprising the steps of
   a. comminuting fresh tea leaf under conditions which retain the natural tea leaf enzyme,
   b. suspending the comminuted leaf in water, the ratio of water to tea leaf material being within the range of 3:1 to 10:1 by weight,
   c. adding tannase to the tea leaf suspension at a level of about eight enzyme units per gram of dry weight of tea leaf tissue at 45° C while maintaining gentle agitation,
   d. adjusting the temperature of the suspension to 25° C and converting the green tea to black tea in the presence of the natural tea enzymes by sparging the suspension with air,
   e. separating the leaf residue from the extract, and
   f. dehazing and polishing the extract, said addition being for a time sufficient to substantially reduce the amount of tea cream produced in the conversion of green tea to black tea.

8. The process of claim 7, where the polished extract obtained in (f) is dried to provide a tea powder.

9. A process of preparing black tea extracts from green tea comprising the steps of
   a. preparing an aqueous homogenate of finely divided green tea leaf, the ratio of water to tea leaf solids being within the range of about 3:1 to about 10:1 by weight,
   b. adding tannase to the homogenate within a temperature range in which the tannase is active, and at a level of at least one enzyme unit per gram of tea leaf solids,
   c. converting the green tea solids to black tea under aerobic conditions in the presence of natural tea leaf enzymes, and
   d. separating the leaf residue from the aqueous extract, said addition being for a time sufficient to substantially reduce the amount of tea cream produced in the conversion of green tea solids to black tea.

10. The process of claim 9, wherein the green tea leaf is freshly picked.

11. The process of claim 9, wherein the tannase is added at a level of from one to 16 enzyme units per gram of tea leaf solids.

12. The process of claim 9, wherein step (b) is conducted at the pH of the tea homogenate, and wherein step (c) is conducted at a pH within the range of about 4.8 to about 6.0.

13. The product of the process of claim 9.

14. The process of claim 9, wherein, following step (c), the leaf residue is separated from the extract, and the extract is dehazed and polished.

15. The process of claim 14, wherein the dehazed and polished extract is dried to provide a tea powder.

* * * * *